United States Patent Office 3,413,162
Patented Nov. 26, 1968

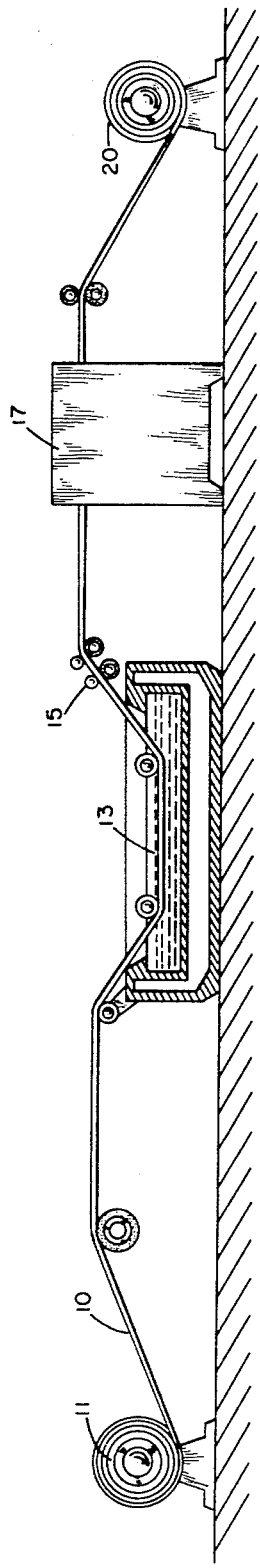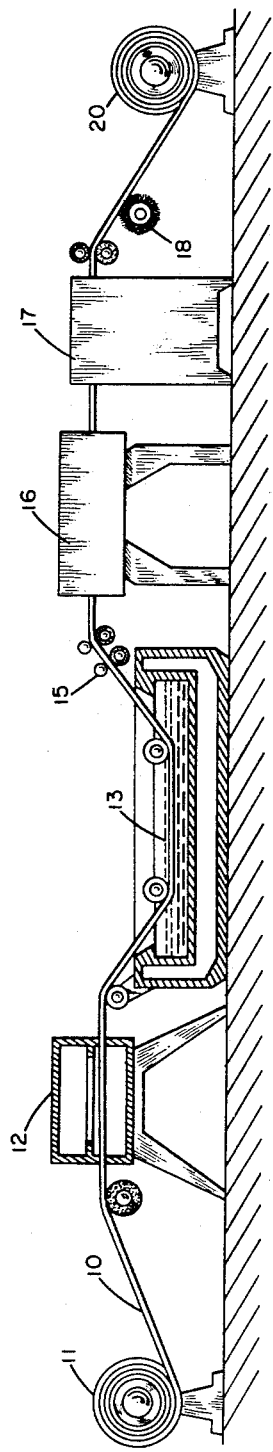

3,413,162
METHOD FOR ELIMINATING TIN SWEAT
IN ALUMINUM-TIN ALLOYS
Raymond L. Slater, Novelty, and George R. Kingsbury, Cieveland, Ohio, assignors to Clevite Corporation, a corporation of Ohio
Continuation-in-part of application Ser. No. 541,684, Apr. 11, 1966. This application Jan. 24, 1967, Ser. No. 611,316
11 Claims. (Cl. 148—20)

ABSTRACT OF THE DISCLOSURE

A method of eliminating or reducing tin sweat problems in aluminum-tin alloys, occasioned by heating the alloy to a temperature sufficiently high to cause exuding of the tin to the surface, by passing the aluminum-tin alloy through a molten bath of lead, antimony or bismuth, or through a molten alloy thereof, or through a molten alloy thereof with arsenic. The aluminum-tin alloy may be passed through the molten bath after the tin has exuded to the surface of the alloy, thereby to remove the excess surface tin, or the aluminum-tin alloy may be passed through the molten bath to cause the tin sweat and simultaneously to remove the excess tin.

Cross reference

This application is a continuation-in-part of U.S. patent application Ser. No. 541,684, filed Apr. 11, 1966 now abandoned, in the names of Raymond L. Slater and George R. Kingsbury, for a Method for Eliminating Tin Sweat in Aluminum-Tin Alloys.

Background of the invention

Aluminum alloys containing tin and other materials are used for making automobile bearings and for many other devices. Often the aluminum alloy is clad on a steel backing and it is desirable to anneal the aluminum to reduce its hardness. The annealing process causes the tin to sweat out of the aluminum and subsequent cooling solidifies the sweat as small tin-rich globules on the surface of the aluminum. If the aluminum alloy strip having these tin-rich surface globules is coiled and cooled, the convolution stick together, making it very difficult to uncoil the strip for further processing. Also, if the aluminum alloy strip is subsequently to be clad to steel, or if further processing is to take place, the surface tin areas must be removed. If the solidified tin sweat is not removed before bonding to steel, areas of very weak bond exist. If the aluminum alloy strip is bonded to steel when it is annealed and it is then recoiled, the tin is transferred to the back of the steel strip.

Prior to this invention the aluminum alloy was scraped, wire brushed or belt-sanded to remove the surface areas of tin. See Patent 3,132,418. The back face of the steel strip also had to be ground to remove the tin. This resulted in rather severe grooving of the strip of aluminum alloy with consequent loss of control of the thickness dimension of the strip. It also resulted in loss of control of the thickness of the steel strip. In the manufacture of automobile bearings where extremely close tolerances are held, the lack of control of the thickness of the aluminum alloy strip is highly undesirable. Further, the tin which is removed from the strip is lost in the form of dust. If the tin is not completely removed it piles up on the dies which form bearings and becomes very objectionable.

It is an object of the present invention to obviate difficulties arising from tin sweat of tin-rich aluminum alloys.

Another object of the invention is to provide a method of eliminating problems due to tin sweat in tin-rich aluminum alloys which are clad to steel, to prevent coils of steel clad aluminum alloy from sticking together, and to eliminate tin areas on the surfaces of the aluminum and steel layers.

Still another object of the invention is to obviate tin sweat problems when annealing aluminum-tin alloy, and to recover the valuable tin which is sweat out of the aluminum alloy.

For a better understanding of the present invention, together with other and further objects thereof, reference is had to the following description taken in connection with the accompanying drawings, and its scope will be pointed out in the appended claims.

FIGURE 1 of the drawing schematically illustrates a line where aluminum-tin alloy is processed in accordance with the invention.

FIGURE 2 schematically illustrates a line similar to that shown in FIGURE 1, but incorporating some optional features.

Summary of the invention

An aspect of the invention lies in the provision of a process for treating aluminum-tin alloy, preferably in strip form, to obviate the tin sweat problem brought about by heating and cooling the alloy, as in annealing. The aluminum-tin alloy is passed through a bath of molten metal such as lead; antimony or bismuth, or alloys thereof, with or without arsenic, where some of the tin is sweat out of the aluminum and it alloys with the molten metal in the bath. Thereafter as the aluminum is removed from the bath the exuded tin alloy clinging to the surface of the aluminum alloy is easily removed by wipers.

Another aspect of the invention lies in the process of treating aluminum-tin alloy at an elevated temperature to cause tin sweat which is thereafter removed in a molten metal bath. The elevated temperature being above the temperature of any subsequent process step, thereby to prevent further tin sweat due to subsequent heating and cooling.

With reference to the drawing there is shown in FIGURE 1 a schematic set-up for treating strip aluminum-alloy. It is to be understood, however, that the aluminum alloy may be batch treated, and that the aluminum alloy to be treated may be adhered to steel strip prior to the treatment disclosed herein.

The following description is particularly pertinent to the manufacture of sleeve bearings for vehicles, wherein the aluminum alloy strip is clad to steel. The method may be performed before the aluminum strip is clad on steel or after the cladding step. The following description of the preferred embodiment relates to a bath of molten lead, but other bath materials may be used, as is described at the end of the specification.

As shown in FIGURE 1 of the drawing, a strip of aluminum alloy 10 is pulled off of a reel 11 and is passed through a bath 13 of molten lead, such for example as an annealing bath, where the temperature of the aluminum alloy is raised to a temperature which causes tin to sweat out of the aluminum and alloy with the molten lead in the bath. Upon emerging from the bath the strip is wiped clean of any lead-tin alloy which clings to its surface by wipers 15. Thereafter it is waterquenched by unit 17 and recoiled at 20. The temperature of the lead bath is about 621° F., the melting point of lead, which is sufficiently above the melting point of tin (450° F.) that only a short period of time is necessary to heat the strip to the point that some of the tin in the alloy is sweated out. It is preferable that the temperature of the bath be kept below about 800° F. Tests have shown that subsequent heating of the recoiled aluminum alloy will not cause tin sweating if the subsequent temperature does not go above the temperature of the lead bath 13. Thus where aluminum alloy goes through a process where it is heated and cooled repeatedly, the initial heating should be in the lead bath and it should be at the highest temperature. Thereafter there will be no tin-sweat problem.

FIGURE 1 shows the essential steps in the process of this invention. However, as a practical matter it is usually desirable to install a preheater before the lead bath, and when making automobile bearings wherein the recrystallization of the aluminum alloy and consolidation of tin lakes in the strip may be important, a holding furnace between the lead bath and the water quench may be necessary. This line is shown in FIGURE 2 wherein the strip 10 of aluminum alloy is pulled from reel 11 and passes through furnace 12 where it is heated preferably to a temperature approaching the temperature of the lead bath 13 into which it then passes. Any tin sweat from the strip 10 alloys with the lead in the bath 13, from which it may eventually be recovered.

If the strip 10 comprises a layer of aluminum alloy clad to steel and if the steel back has undesirable tin-rich areas on it, these areas will be removed in the molten lead bath thereby eliminating the necessity of severely grinding or sanding the steel back with consequent loss of tin and loss of dimensional control. The strip 10 then passes between wipers 15 where any lead-tin alloy material clinging to the strip is wiped off and falls back into the bath 13.

Thereafter the strip 10 progresses through a holding furnace 16 where it is maintained at an elevated temperature below the temperature of the lead bath for a period of time to recrystallize the aluminum into consolidate the tin into lakes. Thereafter a water quench unit 17 quickly cools the strip 10, and a light brush 18 may be used to further clean the surface of the aluminum alloy strip or the steel back, and thereafter the strip 10 is coiled on a recoiler 20 for storage and subsequent use.

If the strip 10 is steel backed it will come out of the water quench with a uniform blue back formed by protective oxides on the surface thereof. The blue back may be buffed or wire brushed by unit 18 if a bright back is desired.

The aforesaid process produces a structure which is not fully reticulated. If a fully reticulated structure is desired, having the tin consolidated into uniformly dispersed lakes throughout the aluminum matrix, the following procedure should be used.

The steel backed aluminum alloy strip 10 is coated with oil and banded into a tight coil. The coil is furnace annealed with or without protective reducing atmosphere, at a temperature between about 475° and 750° F. For a time at a temperature sufficient to produce a fully annealed and reticulated structure. Thereafter the strip is uncoiled and passed through the molten lead bath to remove the tin sweat, followed by a wiping action, a cooling device, and an air drying step. The water quench and air drying produce a uniform blue oxide coating on the steel back.

The aluminum-tin alloy which is benefitted by the aforesaid process has a tin content above about 6%, and it may contain other alloying materials. The time at temperature in the molten lead bath need be only about .5 to 2.0 minutes, which lends itself to a strip rate of 12 to 16 feet per minute.

While molten lead is the preferred bath other materials may be used. The bath may be of antimony or of bismuth. Alloys of any two or three of lead, antimony and bismuth may be used in any proportions.

Arsenic may be alloyed with any one, two or three of lead, antimony and bismuth, but it should be used in such an amount that the alloy has a melting point below that of aluminum. A practical upper limit for the melting point of the alloy is about 1100° F., which is above the melting point of tin and below that of aluminum. However, at this elevated temperature the aluminum alloy is severely softened.

A bath of lead containing about 11% antimony is molten at about 550° F., as antimony depresses the melting point of lead. When such a bath is used the aluminum is only partially annealed and maintains good hardness.

A bath consisting of lead with bismuth is molten down to about 300° F., and may be used to remove tin which has already been exuded to the surface of an aluminum-tin alloy, since even at this low temperature the lead-bismuth will dissolve the tin.

While there have been described what are at present considered to be the preferred embodiments of this invention, it will be obvious to those skilled in the art that various changes and modifications may be made and it is, therefore, aimed in the appended claims to cover all such changes and modifications as fall within the true spirit and scope of the invention.

We claim:
1. The method of eliminating tin sweat problems in aluminum-tin alloys having a tin content above about 6%, which comprises the steps of passing the aluminum-tin alloy through a bath of molten metal selected from the group consisting of lead, bismuth, alloys of any two or three of lead, antimony, bismuth in all proportions; and alloys of arsenic with any one, two or three of lead, antimony, bismuth wherein the arsenic is in such an amount that the melting point of the alloy is below that of aluminum, the temperature of the bath being maintained sufficiently above the melting point of tin to cause the tin to sweat out of the aluminum alloy.

2. The method of eliminating tin sweat problems in aluminum-tin alloys having a tin content above about 6%, which comprises the steps of first preheating the aluminum-tin alloy at a temperature of between about 475 and 750° F. and then passing a preheated aluminum-tin alloy through the molten bath of metal selected from the group consisting of lead, antimony, bismuth in all proportions and alloys of arsenic with any one, two or three of lead, antimony, bismuth wherein the arsenic is in such an amount that the melting point of the alloy is below that of aluminum.

3. The method as set forth in claim 2, further characterized by wiping the aluminum-tin alloy clean as it emerges from the molten bath.

4. The method as set forth in claim 3, further characterized by said aluminum-tin alloy being in strip form, and by passing said strip sequentially through a heater, through the molten bath, past a wiper to wipe the lead-tin alloy from it, and through a quench to cool said strip.

5. The method as set forth in claim 4, further characterized by holding said heated aluminum-tin alloy strip in said molten bath for a time at a temperature between about .5 and 2 minutes.

6. The method as set forth in claim 5, further characterized by, after said strip is removed from said bath, passing it into a holding furnace to hold said strip at or slightly below the temperature of the bath for a period of time sufficient to soften and recrystallize said aluminum-tin alloy and to consolidate the remaining tin in said alloy into lakes, and thereafter cooling said alloy.

7. The method of eliminating tin sweat problems in aluminum-tin alloy strip material having a tin content above about 6% comprising initially heating said aluminum-tin alloy in the form of a coiled strip at a temperature between about 475° and 750° F. for a time at a temperature sufficient to anneal the alloy, cooling the coil of aluminum-tin alloy, and thereafter unwinding the coil and passing the alloy in strip form through a bath selected from the group consisting of molten lead and alloys of lead with antimony, arsenic or bismuth to remove tin sweat.

8. The method as set forth in claim 7, further characterized by wiping the aluminum-tin alloy clean as it emerges from the molten bath.

9. The method as set forth in claim 8, further characterized by passing the aluminum alloy through a cooling device after it has been wiped.

10. The method as set forth in claim 9, further characterized by holding said aluminum-tin alloy in said molten bath for a time period between about .5 and 2.0 minutes.

11. The method of eliminating tin-sweat problems when processing aluminum-tin alloys having a tin content above about 6% which comprises the steps of: heating said aluminum-tin alloy to a temperature above the temperature at which the tin in the alloy substantially melts and sweats to the surface, contacting the said surface of said alloy with a molten bath selected from the group consisting of lead and lead alloy to form a lead-tin alloy with the said tin which has sweat to the surface, cooling said alloy, and thereafter during any further processing of said alloy keeping said alloy at or below the temperature which caused said sweating.

References Cited
UNITED STATES PATENTS

| | | |
|---|---|---|
| 2,067,061 | 1/1937 | Moffatt. |
| 2,284,670 | 6/1942 | McCullough et al. ___ 75—140 X |
| 2,525,203 | 10/1950 | Bostroem. |
| 3,132,418 | 5/1964 | Fulford. |
| 3,194,545 | 7/1965 | Smith _____ 148—13 X |
| 3,195,991 | 7/1965 | Stern et al. _____ 29—492 X |

OTHER REFERENCES

Metaux: Corrosion Industries, September 1959, pp. 318–323.

CHARLES N. LOVELL, *Primary Examiner*.